(12) United States Patent  
Hofmann et al.

(10) Patent No.: US 8,108,563 B2  
(45) Date of Patent: Jan. 31, 2012

(54) AUXILIARY WRITES OVER ADDRESS CHANNEL

(75) Inventors: Richard Gerard Hofmann, Cary, NC (US); Terence J. Lohman, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 11/468,933

(22) Filed: Aug. 31, 2006

(65) Prior Publication Data

US 2007/0233904 A1 Oct. 4, 2007

Related U.S. Application Data

(60) Provisional application No. 60/776,517, filed on Feb. 24, 2006.

(51) Int. Cl.  
*G06F 3/00* (2006.01)

(52) U.S. Cl. ........... 710/7; 710/3; 710/5; 710/9; 710/20; 710/21; 710/29; 710/33; 710/62

(58) Field of Classification Search .................. 710/3, 5, 710/7, 9, 20, 21, 29, 33, 62  
See application file for complete search history.

(56) References Cited

U.S. PATENT DOCUMENTS

| | | | |
|---|---|---|---|
| 4,747,101 A | 5/1988 | Akaiwa et al. | |
| 5,255,376 A | 10/1993 | Frank | |
| 5,612,742 A | 3/1997 | Krause et al. | |
| 5,745,707 A | 4/1998 | Takahashi | |
| 5,936,956 A | 8/1999 | Naven | |
| 6,151,262 A * | 11/2000 | Haroun et al. | 365/227 |
| 6,163,835 A | 12/2000 | Todd et al. | |
| 6,292,873 B1 | 9/2001 | Keaveny | |
| 6,434,638 B1 | 8/2002 | Deshpande | |
| 7,392,353 B2 | 6/2008 | Barrett et al. | |
| 2003/0126331 A1 | 7/2003 | Levy | |
| 2005/0071533 A1* | 3/2005 | Adams et al. | 710/309 |
| 2005/0165995 A1 | 7/2005 | Gemelli et al. | |
| 2005/0172063 A1 | 8/2005 | Hofmann et al. | |
| 2005/0223158 A1* | 10/2005 | See et al. | 711/103 |

(Continued)

FOREIGN PATENT DOCUMENTS

GB 2362735 11/2001

(Continued)

OTHER PUBLICATIONS

International Preliminary Report on Patentability, PCT/US07/062830, The International Bureau of WIPO, Geneva, Switzerland, Aug. 26, 2008.

(Continued)

*Primary Examiner* — Tariq Hafiz  
*Assistant Examiner* — Jasjit Vidwan  
(74) *Attorney, Agent, or Firm* — Nicholas J. Pauley; Peter M. Kamarchik; Jonathan T. Velasco

(57) ABSTRACT

A processing system and method for communicating in a processing system over a bus is disclosed. The processing system includes a receiving device, a bus having first, second and third channels, and a sending device configured to address the receiving device on the first channel, and read a payload from the receiving device on the second channel, the sending device being further configured to select between the first and third channels to write a payload to the receiving device.

39 Claims, 9 Drawing Sheets

U.S. PATENT DOCUMENTS

2005/0273537 A1* 12/2005 Harris et al. .................. 710/110

FOREIGN PATENT DOCUMENTS

| JP | 62231365 A | 10/1987 |
|---|---|---|
| JP | 2012358 A | 1/1990 |
| JP | 2025958 A | 1/1990 |
| JP | 9507325 T | 7/1997 |
| JP | 2000115208 A | 4/2000 |
| JP | 2000215183 A | 8/2000 |
| JP | 2003050742 A | 2/2003 |
| JP | 2007520832 A | 7/2007 |
| RU | 2154346 C2 | 8/2000 |
| SU | 1550524 A1 | 3/1990 |
| SU | 1807493 A1 | 4/1993 |
| WO | WO2005078594 | 8/2005 |

OTHER PUBLICATIONS

Written Opinion, PCT/US07/062830, International Search Authority, European Patent Office, Jul. 5, 2007.

International Search Report, PCT/US07/062830, International Searching Authority, European Patent Office, Jul. 5, 2007.

Transmission Control Protocol, Feb. 14, 2005, HTTP://WEB.ARCHIVE.ORG/WEB/20050214112558/HTTP;//TCP.MYWEBCITIES.COM/.

* cited by examiner

AUXILIARY WRITES OVER ADDRESS CHANNEL

RELATED APPLICATIONS

The present Application for Patent claims priority to Provisional Application No. 60/776,517 entitled "Auxiliary Writes Over Address Channel" filed Feb. 24, 2006, and assigned to the assignee hereof and hereby expressly incorporated by reference herein.

The present Application for Patent is related to the following co-pending U.S. Patent Applications:

"Cooperative Writes Over Address Channel of a Bus" having Ser. No. 11/468,908, filed Aug. 31, 2006, assigned to the assignee hereof, and expressly incorporated by reference herein.

BACKGROUND

1. Field

The present disclosure relates generally to processing systems, and more specifically, to systems and techniques for performing auxiliary writes over the address channel of a bus.

2. Background

At the heart of most modern processing systems is an interconnect referred to as a bus. The bus moves information between various processing entities in the system. Today, most bus architectures are fairly standardized. These standardized bus architectures typically have independent and separate read, write and address channels.

This type of bus architecture is often found in processing systems with one or more general purpose processors supported by memory. In these systems, the memory provides a storage medium that holds the programs and data needed by the processors to perform their functions. A processor may read or write to the memory by placing an address on the address channel and sending the appropriate read/write control signal. Depending on the state of the read/write control, the processor either writes to the memory over the write channel or reads from the memory over the read channel. In these types of processing systems, as well as many others, it is desirable to reduce the write latency and increase the write bandwidth.

SUMMARY

One aspect of a processing system is disclosed. The processing system includes a receiving device, a bus having first, second and third channels, and a sending device configured to address the receiving device on the first channel, and read a payload from the receiving device on the second channel, the sending device being further configured to select between the first and third channels to write a payload to the receiving device.

Another aspect of a processing system is disclosed. The processing system includes a receiving device, a bus having first, second and third channels, means for addressing the receiving device on the first channel, means for reading a payload from the receiving device on the second channel, and means for selecting between the first and third channels to write a payload to the receiving device.

An aspect of a method of communicating between a sending device and one or more receiving devices over a bus is disclosed. The bus includes first, second and third channels. The method includes addressing a receiving device on the first channel, reading a payload from the receiving device on the second channel, and selecting between the first and third channels to write a payload to the receiving device.

An aspect of a bus mastering device is disclosed. The bus mastering device includes a processor, and a bus interface configured to interface the processor to a bus having first, second and third channels, the bus interface being further configured to address a slave on the first channel, receive a payload from the slave on the second channel, and select between the first and third channels to send a payload to the slave.

Another aspect of a bus mastering device is disclosed. The bus mastering device includes a processor, and means for interfacing the processor to a bus having first, second and third channels, the means for interfacing the processor to the bus comprising means for addressing a slave on the first channel, means for receiving a payload from the slave on the second channel, and means for selecting between the first and third channels to send a payload to the slave.

An aspect of a slave device is disclosed. The slave device includes memory, and a bus interface configured to interface the memory to a bus having first, second and third channels, the bus interface being configured to receive a memory address and a first payload from a bus mastering device on the first channel, receive a second payload from the bus mastering device on the second channel, and send a payload to the bus mastering device on the third channel.

Another aspect of a slave device is disclosed. The slave device includes memory, and means for interfacing the memory to a bus having first, second and third channels, the means for interfacing the memory to the bus comprising means for receiving a memory address and a first payload from a bus mastering device on the first channel, means for receiving a second payload from the bus mastering device on the second channel, and means for sending a payload to the bus mastering device on the third channel.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
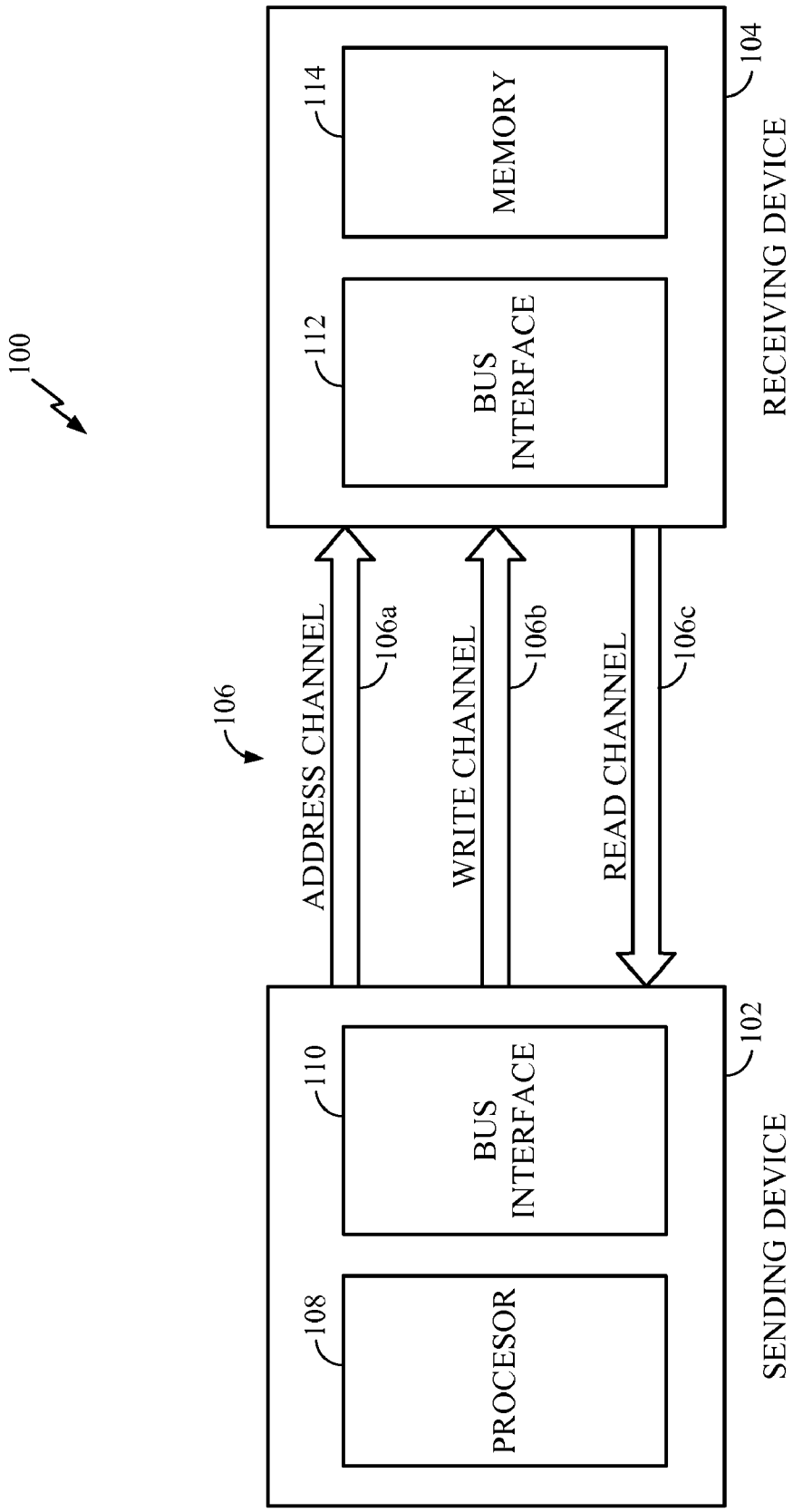
FIG. 1 is a simplified block diagram illustrating an example of two devices in a processing system communicating over a bus.

FIG. 1 is a simplified block diagram illustrating an example of two devices in a processing system communicating over a bus. The processing system 100 may be a collection of hardware devices that cooperate to perform one or more processing functions. Typical applications of the processing system 100 include, but are not limited to, desktop computers, laptop computers, servers, cellular phones, personal digital assistants (PDA), game consoles, pagers, modems, audio equipment, medical devices, automotive, video equipment, industrial equipment, or any other machine or device capable of processing, retrieving and storing information.

The processing system 100 is shown with a sending device 102 in communication with a receiving device 104 over a bus 106. The bus 106 includes three channels: an address channel 106*a*, a write channel 106*b*, and a read channel 106*c*. A "channel" is defined as a set of electrical conductors used to carry information between two devices and which has a set of common control signals. In this example, the address channel is 32-bits wide, and the write and read channels are each 64-bits wide. Typically, a bus interconnect (not shown) will be used to establish a point-to-point communications path between the sending device 102 and the receiving device 104 over the bus 106. Alternatively, the bus 106 may be a dedicated bus, a shared bus, or any other type of suitable bus architecture.

The sending device 102 may be any type of bus mastering device. In this example, the sending device 102 includes a processor 108 and a bus interface 110. The processor 108 may be a general purpose processor, such as a microprocessor, a special purpose processor, such as a digital signal processor (DSP), an application specific integrated circuit (ASIC), a direct memory access (DMA) controller, a bridge, a programmable logic component, or any other entity that requires access to the bus 106. The bus interface 110 is used to drive the address and write channels 106*a*, 106*b*, as well as provide the appropriate control signals. The bus interface 110 also serves as a receiver for the read channel 106*c*.

The receiving device 104 may be any type of slave device. The receiving device 104 may be temporary memory, such as SDRAM, DRAM, or RAM, or a longer term storage device such as flash memory, ROM memory, EPROM memory, EEPROM memory, CD-ROM, DVD, magnetic disk, rewritable optic disk and the like. Alternatively, the receiving device 104 may be a bridge or any other device capable of retrieving and storing information. In this example, the receiving device 104 includes a bus interface 112 and memory 114. The bus interface 112 is used to drive the read channel 106*c* and the appropriate control signals. The bus interface 112 also serves as a receiver for the address and write channels 106*a*, 106*b*. The memory 114 may be any device whose contents can be accessed (i.e., read and written to) randomly.

In this bus architecture, the sending device 102 may read or write to the receiving device 104. When the sending device 102 performs a write operation, it sends the address to the receiving device 104 on the address channel 106*a* with the appropriate control signals. The payload may be sent either on the address channel 106*a* or the write channel 106*b*. The "payload" refers to the data associated with a particular read or write operation, and in this case, a write operation. When the sending device performs a read operation, it sends the address to the receiving device 104 on the address channel 106*a* with the appropriate control signals. In response, the receiving device 104 sends the payload to the sending device 102 on the read channel 106*c*.

Figure 2:
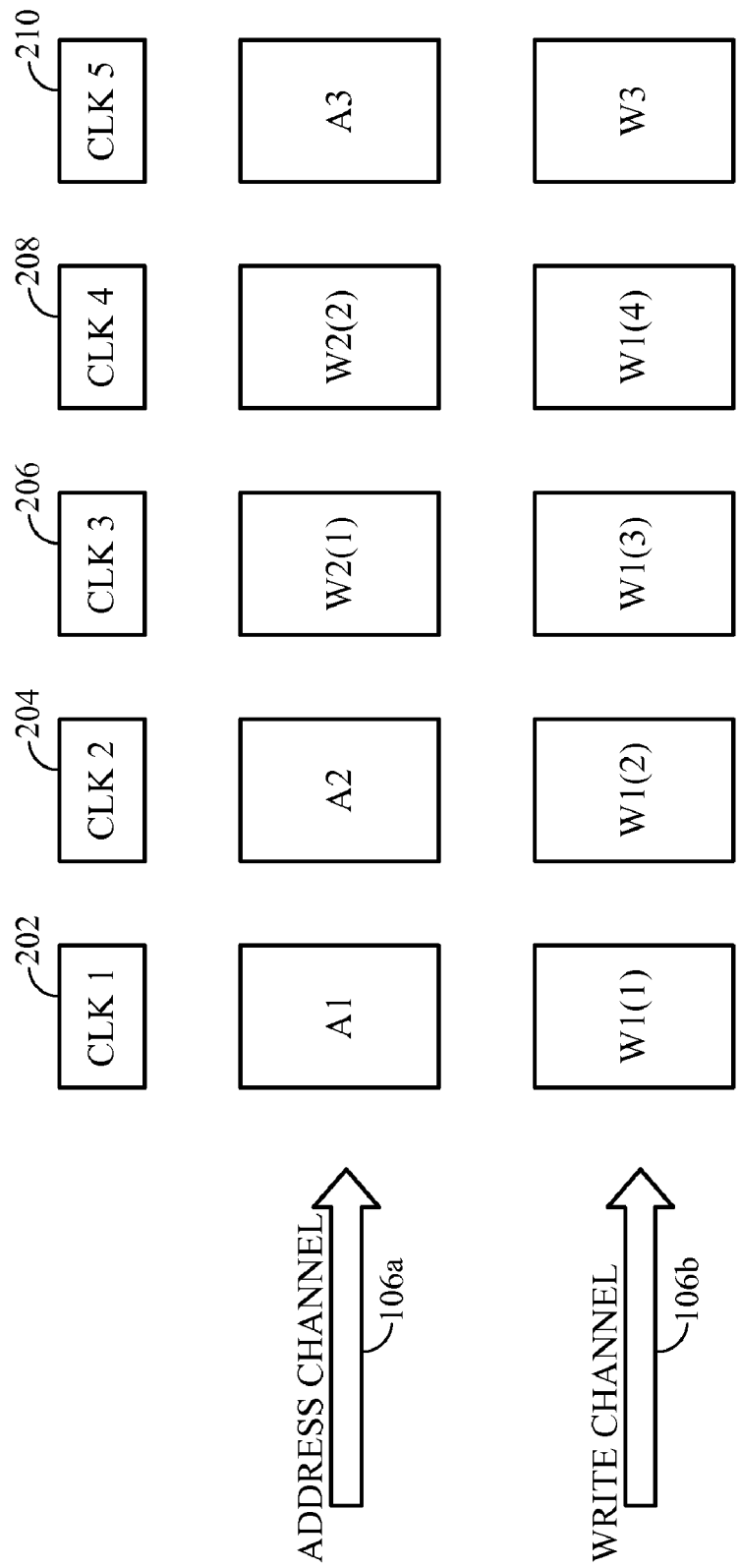
FIG. 2 is an illustration showing information flowing on the address and write channels of a bus in the processing system of FIG. 1 with the address channel providing a generic medium for addresses and payloads.

An example of three write operations will now be described with reference to FIG. 2. FIG. 2 is an illustration showing the information flowing on the address and write channels. In this example, the sending device initiates a 32-byte write operation followed by two 8-byte write operations.

Referring to FIG. 2, on the first clock cycle 202, the sending device initiates the 32-byte write operation by sending a 4-byte address A1 to the receiving device on the address channel 106*a* with the appropriate control signals. During the same clock cycle 202, the sending device also sends the first 8-bytes of the first payload W1(1) to the receiving device on the write channel 106*b*.

The sending device initiates the next write operation during the second clock cycle 204 by sending a 4-byte address A2 to the receiving device before completion of the first write operation on the address channel 106*a* with the appropriate control signals. The sending device continues to transmit the first payload during the same clock cycle by sending the second 8-bytes W1(2) to the receiving device on the write channel 106*b*.

The sending device then uses the next two clock cycles 206 and 208 to send the second payload to the receiving device on the address channel 106*a*, while concurrently completing the transmission of the first payload on the write channel 106*b*. In particular, in the third clock cycle 206, the sending device sends to the receiving device the first 4-bytes of the second payload W2(1) on the address channel 106*a* and the third 8-bytes of the first payload W1(3) on the write channel 106*b*. On the fourth clock cycle 208, the sending device sends to the receiving device the final 4-bytes of the second payload W2(2) on the address channel 106*a* and the final 8-bytes of the first payload W1(4) on the write channel 106*b*.

The sending device initiates the third write operation on the fifth clock cycle 210 by sending a 4-byte address A3 to the receiving device on the address channel 106*a* with the appropriate control signals. During the same clock cycle 210, the sending device also sends the third payload W3 to the receiving device on the write channel 106*b*.

Two control signals may be added to the address channel 106*a* to create a medium to support the transmission of both addresses and payloads. The first control signal, referred to as an "Address/Data" signal is used to indicate whether the information being transmitted on the address channel 106*a* is an address or a payload. In this example, when the Address/Data signal is asserted, an address is being transmitted on the address channel 106a. Conversely, when the Address/Data signal is deasserted, the payload is being transmitted on the address channel 106a. The second control signal, referred to as a "Transfer Attribute," is used when transmitting an address on the address channel 106a. When an address is being transmitted, the "Transfer Attribute" signal is used to indicate whether the payload for that address will be transmitted on the address channel 106a or the write channel 106b.

An example illustrating how these control signals may be used will now be described with reference to FIG. 3. The bus protocol for the address and write channels 106a, 106b is shown below in Table 1. This bus protocol is being used to illustrate the inventive aspects of a processing system, with the understanding that such inventive aspects may be used with other bus protocols. Those skilled in the art will readily be able to vary and/or add signals to this protocol in the actual implementation of the bus architectures described herein.

TABLE 1

| Signal | Definition | Driven By |
|---|---|---|
| Address Channel | | |
| Address | 32-bit medium to transmit addresses and payloads. | Sending Device |
| Address/Data | Indicates whether the information being transmitted on the address channel is an address or a payload. | Sending Device |
| AValid | Indicates whether valid information is being transmitted on the address channel. | Sending Device |
| Transfer Attribute | Indicates whether the payload for the current address will be transmitted on the address channel or the write channel. | Sending Device |
| Read/Write | Indicates whether a read or write operation is being requested. | Sending Device |
| Payload Size | Indicates the size of the payload for the current address. | Sending Device |
| Address Transfer Ack | Indicates whether the receiving device has successfully received information transmitted on the address channel. | Receiving Device |
| Write Channel | | |
| Write | 64-bit medium to transmit payloads. | Sending Device |
| WValid | Indicates whether valid information is being transmitted on the write channel. | Sending Device |
| Write Transfer Ack | Indicates whether the receiving device has successfully received information transmitted on the write channel. | Receiving Device |

Figure 3:
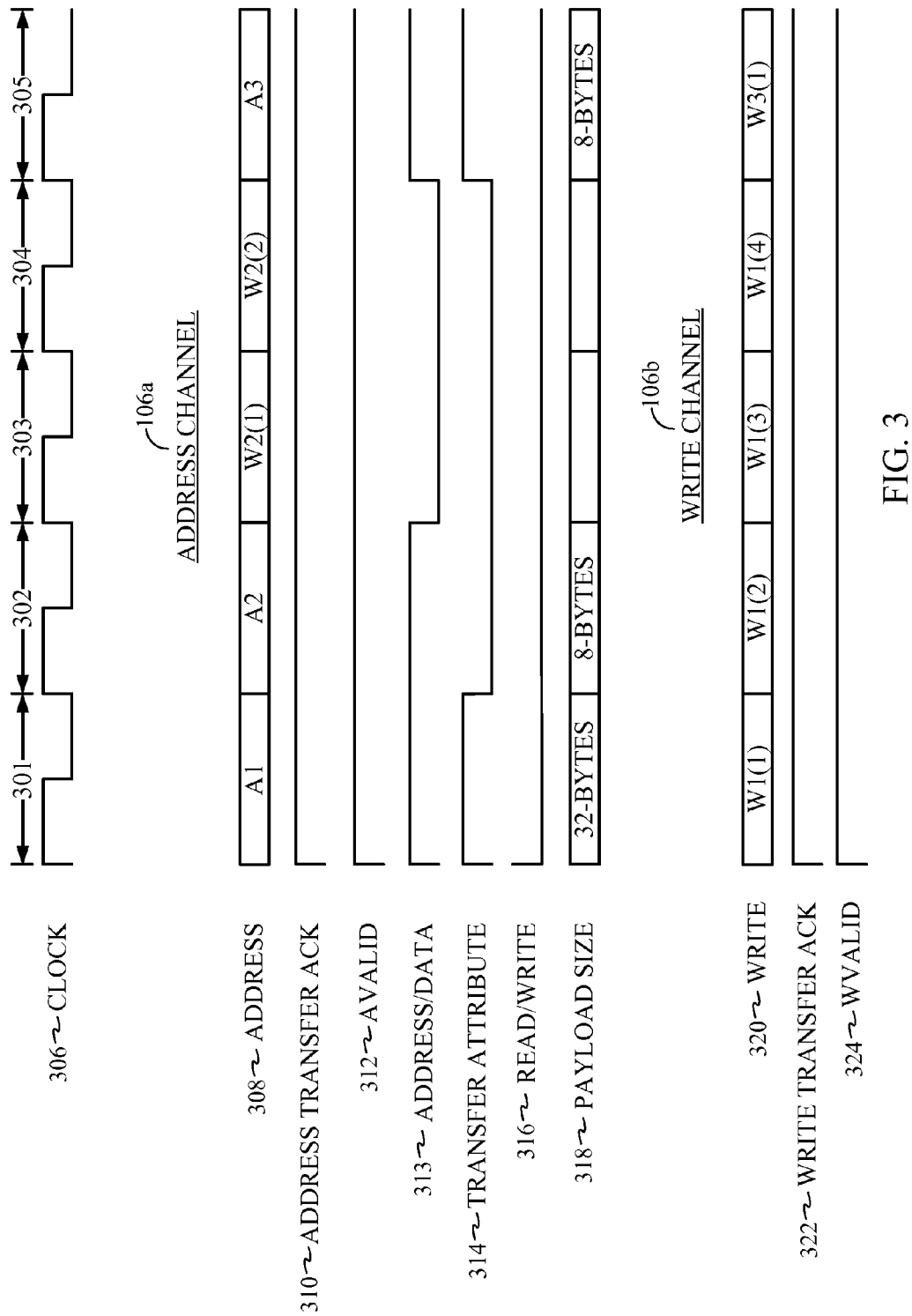
FIG. 3 is a timing diagram showing three write operations over a bus in the processing system of FIG. 1.

FIG. 3 is a timing diagram showing the control signaling for the same three write operations described above in connection with FIG. 2. A System Clock 306 may be used to synchronize communications between the sending and receiving devices. The System Clock 306 is shown with five clock cycles, with each clock cycle numbered sequentially.

A write operation may be initiated on the address channel 106a by the sending device during the first clock cycle 301. This operation may be achieved by transmitting the address A1 for the first write operation on the 32-bit Address medium 308. Concurrently, the sending device asserts the AValid, Address/Data, and Transfer Attribute signals 312, 313, 314. The asserted AValid signal 312 indicates that valid information is being transmitted on the address channel 106a, the asserted Address/Data signal 313 indicates that the information is an address A1, and the asserted Transfer Attribute signal 314 indicates that the payload for the address A1 will be transmitted on the write channel 106b. The sending device also deasserts the Read/Write signal 316 to request a write operation. The Payload Size 318 signal may be used to indicate the size of the payload, which in this case is 32-bytes.

During the same first clock cycle 301, the sending device uses the Write medium 320 to transmit the first 8-bytes of the first payload W1(1). The sending device also asserts the Wvalid signal 324 to indicate that valid information is being transmitted on the write channel 106b.

At the end of the first clock cycle 301, the sending device checks for an asserted Address Transfer Ack signal 310 to confirm the successful delivery of the address A1 over the address channel 106a to the receiving device. The sending device also checks for an asserted Write Transfer Ack signal 322 to confirm the successful delivery of the first 8-bytes of the first payload W1(1) over the write channel 106b to the receiving device.

On the second clock cycle 302, the sending device transmits the address A2 for the second write operation on the 32-bit Address medium 308 before the first write operation completes. The sending device asserts the AValid signal 312 to indicate that valid information is being transmitted on the address channel 106a. The sending device also asserts the Address/Data signal 313 to indicate that the information is an address A2. The Transfer Attribute 314 is deasserted to indicate that the payload for the address A2 will be transmitted on the address channel 106a. The sending device also deasserts the Read/Write signal 316 to request a write operation. The Payload Size 318 signal may be used to indicate the size of the payload, which in this case is 8-bytes.

During the same second clock cycle 302, the sending device uses the Write medium 320 to send the second 8-bytes of the first payload W1(2). The sending device also asserts the Wvalid signal 324 to indicate that valid information is being transmitted on the write channel 106b.

At the end of the second clock cycle 302, the sending device checks for an asserted Address Transfer Ack signal 310 to confirm the successful delivery of the address A2 over the address channel 106a to the receiving device. The sending device also checks for an asserted Write Transfer Ack signal 322 to confirm the successful delivery of the second 8-bytes of the first payload W1(2) over the write channel 106b to the receiving device.

On the third clock cycle 303, the sending device transmits the first 4-bytes of the second payload W2(1) on the 32-bit Address medium 308. The sending device asserts the AValid signal 312 to indicate the valid information is being transmitted on the address channel 106a and deasserts the Address/Data signal 313 to indicate that the information is part of a payload. The state of the Transfer Attribute signal 314, Read/Write signal 316, and Payload Size 318 signal can be ignored during this clock cycle. In FIG. 3, the states for these signals remain unchanged, but could be set to any state.

During the same third clock cycle 303, the sending device uses the Write medium 320 to send the third 8-bytes of the first payload W1(3). The sending device also asserts the Wvalid signal 324 to indicate that valid information is being transmitted on the write channel 106b.

At the end of the third clock cycle 303, the sending device checks for an asserted Address Transfer Ack signal 310 to confirm the successful delivery of the first 4-bytes of the second payload W2(1) over the address channel 106a to the receiving device. The sending device also checks for an asserted Write Transfer Ack signal 322 to confirm the successful delivery of the third 8-bytes of the first payload W1(3) over the write channel 106b to the receiving device.

On the fourth clock cycle 304, the sending device transmits the final 4-bytes of the second payload W2(2) on the 32-bit Address medium 308. The sending device asserts the AValid signal 312 to indicate the valid information is being transmitted on the address channel 106a and deasserts the Address/Data signal 313 to indicate that the information is part of a payload. The state of the Transfer Attribute signal 314, Read/Write signal 316, and Payload Size 318 signal can be ignored during the payload tenure.

During the same fourth clock cycle 304, the sending device uses the Write medium 320 to send the final 8-bytes of the first payload W1(4). The sending device continues to assert the Wvalid signal 324 to indicate that valid information is being transmitted on the write channel 106b.

At the end of the fourth clock cycle 304, the sending device checks for an asserted Address Transfer Ack signal 310 to confirm the successful delivery of the final 4-bytes of the second payload W2(2) over the address channel 106a to the receiving device. The sending device also checks for an asserted Write Transfer Ack signal 322 to confirm the successful delivery of the final 8-bytes of the first payload W1(4) over the write channel 106b to the receiving device.

On the fifth clock cycle 305, the sending device transmits the address A3 for the third write operation on the 32-bit Address medium 308. The sending device asserts the AValid signal 312 to indicate that valid information is being transmitted on the address channel 106a. The sending device also asserts the Address/Data signal 313 to indicate that the information being transmitted on the address channel 106a is an address A3. The Transfer Attribute signal 314 is also asserted by the sending device to indicate that the payload for the address A3 will be transmitted on the write channel 106b. The Read/Write signal 316 remains deasserted to request a write operation. The Payload Size 318 signal may be used to indicate the size of the payload, which in this case is 8-bytes.

During the same fifth clock cycle 305, the sending device uses the Write medium 320 to send the payload W3. The sending device also asserts the Wvalid signal 324 to indicate that valid information is being transmitted on the write channel 106b.

At the end of the fifth clock cycle 305, the sending device checks for an asserted Address Transfer Ack signal 310 to confirm the successful delivery of the address A3 over the address channel 106a to the receiving device. The sending device also checks for an asserted Write Transfer Ack signal 322 to confirm the successful delivery of the third payload W3 over the write channel 106b to the receiving device.

Figure 4:
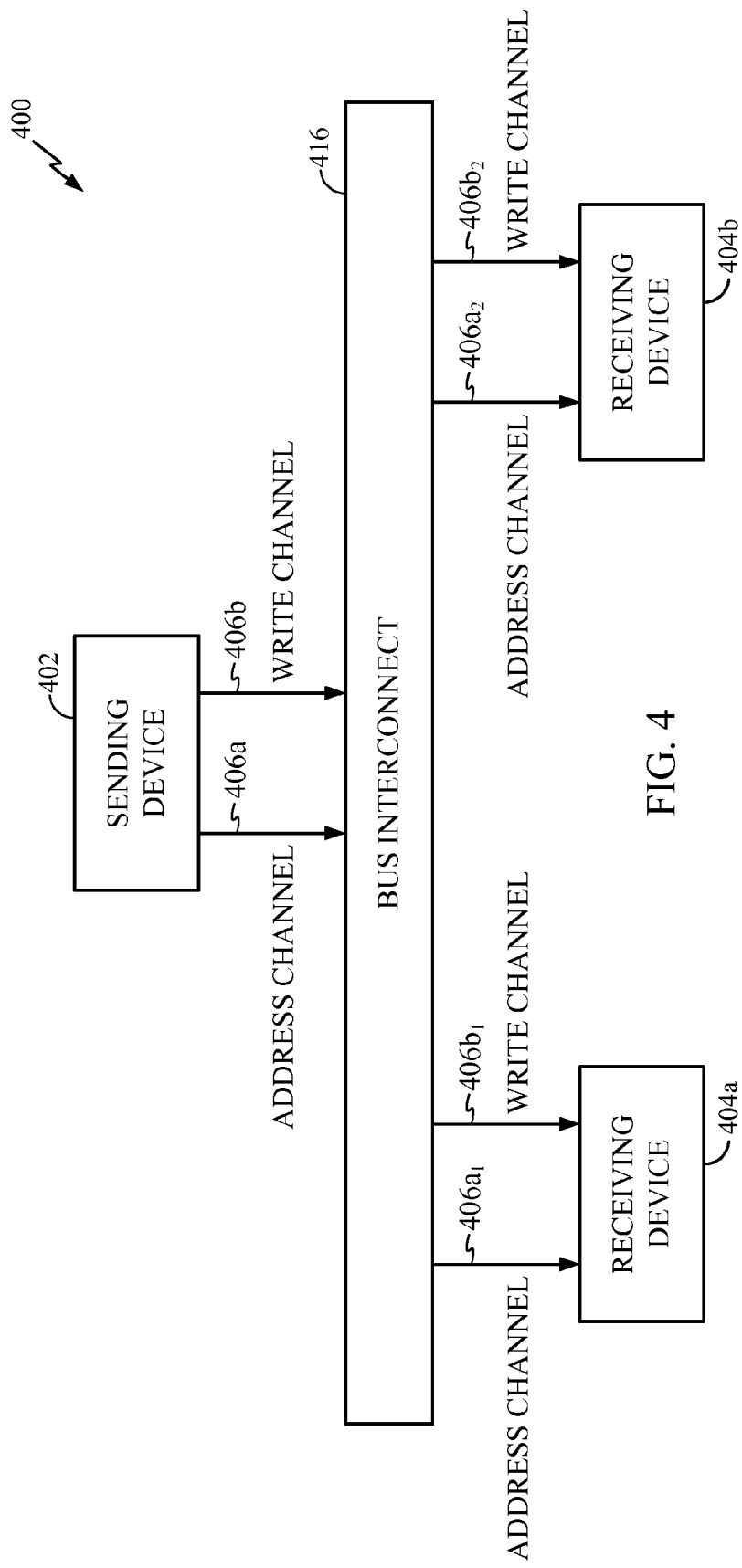
FIG. 4 is a simplified block diagram illustrating a sending device in communication with two receiving devices in a processing system.

FIG. 4 is a simplified block diagram illustrating a sending device 402 in communication with two receiving devices 404a, 404b through a bus interconnect 416 in a processing system 400. In this example, the sending device 402 can write to both receiving devices 404a, 404b concurrently using the 32-bit address channel 406a as a medium for transmitting addresses and payloads to the bus interconnect 416. The bus interconnect 416 can then use the 32-bit address channels $406a_1$, $406a_2$ to address the receiving devices 404a, 404b and the 64-bit write channels $406b_1$, $406b_2$ to transmit the payloads. In the case where the bus interconnect 416 needs to perform multiple write operations to one or both receiving devices 404a, 404b, the address channels $406a_1$, $406a_2$ may also be used as media to transmit both addresses and payloads.

Figure 5:
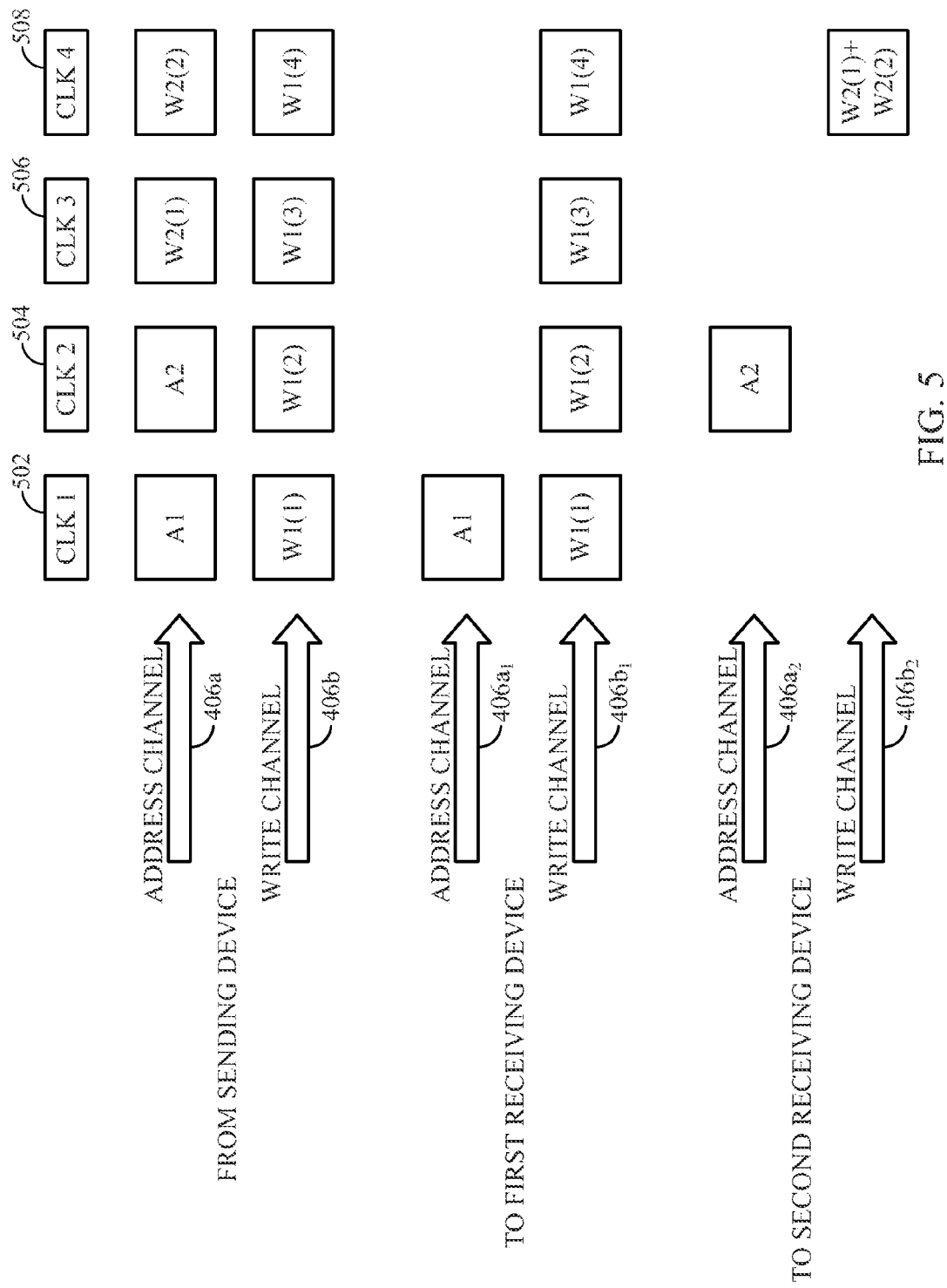
FIG. 5 is an illustration showing information flowing on the address and write channels of a bus in the processing system of FIG. 4.

An example will now be described with reference to FIG. 5. FIG. 5 is an illustration showing the information flowing on the address and write channels. In this example, the bus interconnect 416 will provide point-to-point connections that allow each transmission from the sending device 402 to reach one of the receiving devices 404a, 404b in the same clock cycle. In practice, however, the bus interconnect 416 may be a clocked device with buffering (see FIG. 4).

Referring to FIG. 5, the sending device initiates a 32-byte write operation followed by an 8-byte write operation. On the first clock cycle 502, the sending device initiates the 32-byte write operation by sending an address A1 to the bus interconnect on the address channel 406a with the appropriate control signals. During the same clock cycle 502, the sending device also sends the first 8-bytes of the first payload W1(1) to the bus interconnect on the write channel 406b. The bus interconnect transmits the address A1 to the first receiving device 404a on the first receiving device's address channel $406a_1$, and transmits the first 8-bytes of the first payload W1(1) to the first receiving device 404a on the first receiving device's write channel $406b_1$.

On the second clock cycle 504, the sending device initiates the next write operation by sending an address A2 to the bus interconnect on the address channel 406a with the appropriate control signals. During the same clock cycle 504, the sending device also sends the second 8-bytes of the first payload W1(2) to the bus interconnect on the write channel 406b. The bus interconnect 416 transmits the address A2 to the second receiving device 404b on the second receiving device's address channel $406a_2$, and transmits the second 8-bytes of the first payload W1(2) to the first receiving device 404a on the first receiving device's write channel $406b_1$.

On the third and fourth clock cycles 506, 508, the sending device sends the remainder of the first payload W1(3), W1(4) through the bus interconnect to the first receiving device 404a on the write channels 406b, $406b_1$. During the same third and fourth clock cycles 506, 508, the sending device transmits the second payload W2(1), W2(2) to the bus interconnect on the address channel 406a. The second payload W2(1), W(2), being only 8-bytes, may be transmitted in the third and fourth clock cycles 506, 508 by the bus interconnect to the second receiving device over half the byte lanes on the second receiving device's write channel $406b_2$. Alternatively, the bus interconnect can transmit the entire payload during the fourth clock cycle 508 on the 64-bit write channel $406b_2$ for the second receiving device, as shown.

Figure 6:
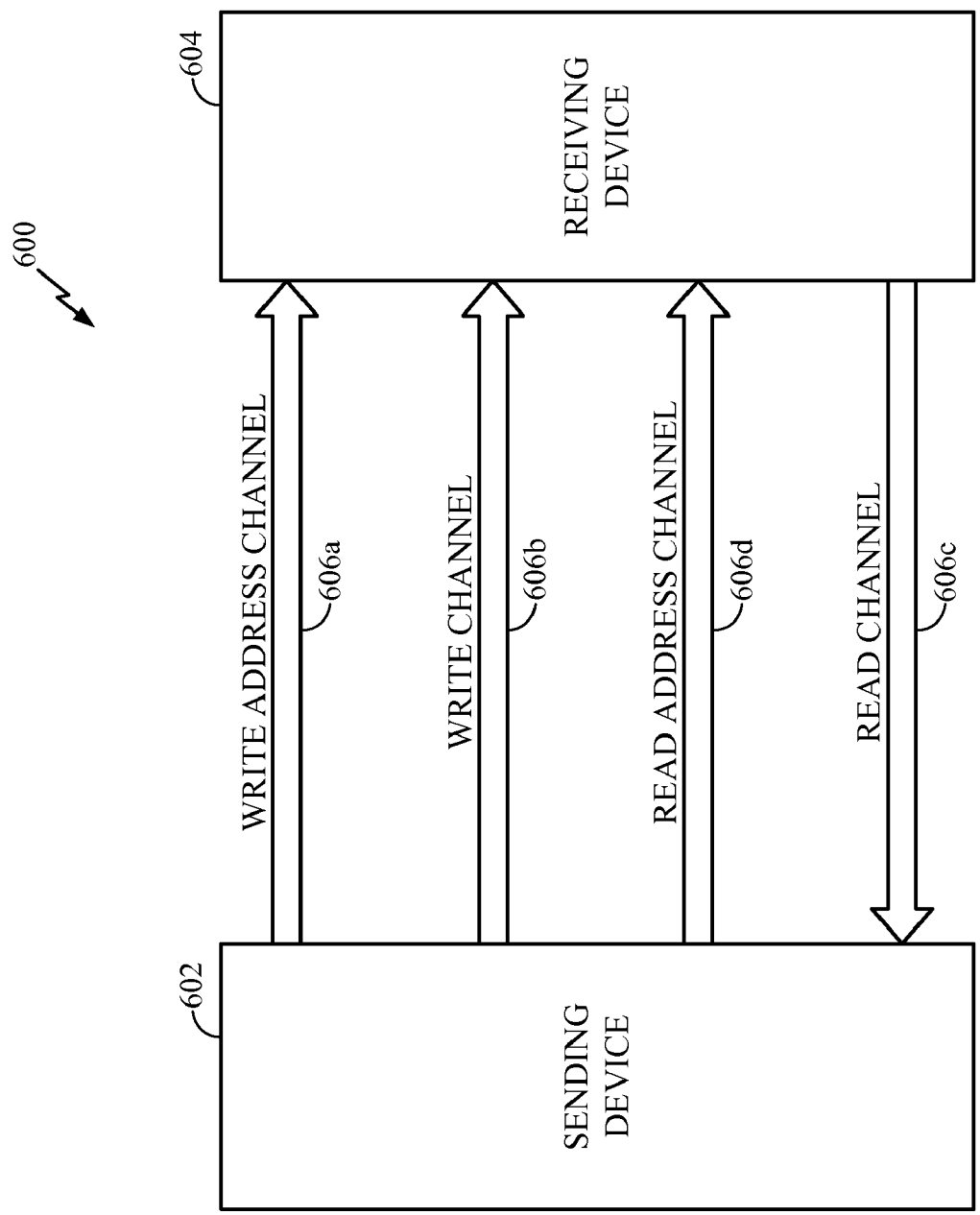
FIG. 6 is a simplified block diagram illustrating an example of two devices in a processing system communicating over a 4-channel bus.

FIG. 6 is a simplified block diagram illustrating an example of two devices in a processing system 600 communicating over a 4-channel bus. A separate and independent address channel is provided for each of the read and write channels. In this example, each channel is 32-bits wide, but may be any width in practice depending upon the particular application and overall design constraints. A write operation over the 4-channel bus may be performed in the same way described earlier in connection with the 3-channel bus. That is, the sending device 602 transmits address on the write address channel 606a and payloads on both the write address channel 606a and the write channel 606b. The difference between the two bus architectures is the manner in which the read operation is performed. A read operation over the 4-channel bus is performed by sending to the receiving device 604 the address on a read address channel 606d. In response, the receiving device 604 sends the payload to the sending device 602 on the read channel 606c.

An example will now be described with reference to FIG. 7. The bus protocol for the address and write channels 606a, 606b, 606d is listed below in Table 2. This bus protocol is being used to illustrate the inventive aspects of a processing system, with the understanding that such inventive aspects may be used with other bus protocols. Those skilled in the art will readily be able to vary and/or add signals to this protocol in the actual implementation of the bus architectures described herein.

TABLE 2

| Signal | Definition | Driven By |
|---|---|---|
| *Write Address Channel* | | |
| Write Address | 32-bit medium to transmit write addresses and payloads. | Sending Device |
| Write Address/Data | Indicates whether the information being transmitted on the write address channel is a write address or a payload. | Sending Device |
| Transfer Attribute | Indicates whether the payload for the current address will be transmitted on the write address channel, read address channel or the write channel. | Sending Device |
| Write AValid | Indicates whether valid information is being transmitted on the write address channel. | Sending Device |
| Write Payload Size | Indicates the size of the payload for the current write address. | Sending Device |
| Write Address Transfer Ack | Indicates whether the receiving device has successfully received information transmitted on the write address channel. | Receiving Device |
| *Read Address Channel* | | |
| Read Address | 32-bit medium to transmit read addresses and payloads. | Sending Device |
| Read Address/Data | Indicates whether the information being transmitted on the read address channel is a read address or a payload. | Sending Device |
| Read AValid | Indicates whether valid information is being transmitted on the read address channel. | |
| Read Payload Size | Indicates the size of the payload for the current read address. | Sending Device |
| Read Address Transfer Ack | Indicates whether the receiving device has successfully received information transmitted on the read address channel. | Receiving Device |
| *Write Channel* | | |
| Write | 32-bit medium to transmit payloads. | Sending Device |
| WValid | Indicates whether valid information is being transmitted on the write channel. | Sending Device |
| Write Transfer Ack | Indicates whether the receiving device has successfully received information transmitted on the write channel. | Receiving Device |

The protocol for the Transfer Ack signal on the write address channel is shown below in Table 3.

TABLE 3

| Transfer Attribute | Definition |
|---|---|
| 000 | Payload for the current address will be transmitted on the write channel. |
| 001 | Payload for the current address will be transmitted on the write address channel. |
| 010 | Payload for the current address will be transmitted on the read address channel. |
| 011 | Reserved |

Figure 7:
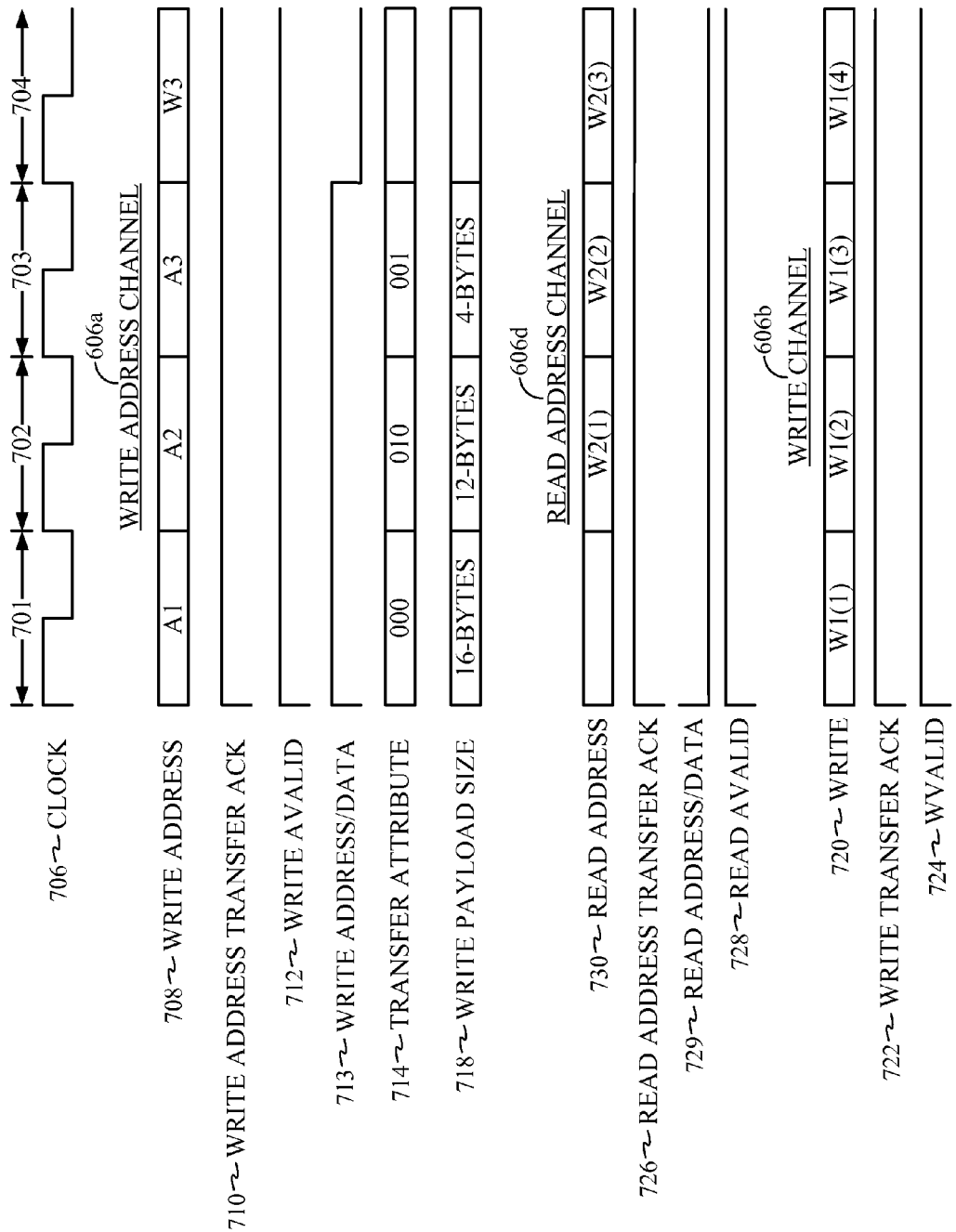
FIG. 7 is a timing diagram showing three write operations over a bus in the processing system of FIG. 6.

FIG. 7 is a timing diagram showing the control signaling for a 16-byte write operation followed by a 12-byte write operation and then a 4-byte write operation. A System Clock 706 may be used to synchronize communications between the sending and receiving devices. The System Clock 706 is shown with four clock cycles, with each clock cycle numbered sequentially.

A write operation may be initiated on the address channel 606a by the sending device during the first clock cycle 701. This operation may be achieved by transmitting the address A1 for the first write operation on the 32-bit Write Address medium 708. During the same clock cycle 701, the sending device asserts the Write AValid signal 712 to indicate that valid information is being transmitted on the write address channel 606a. The sending device also asserts the write Address/Data signal 713 to indicate that the information is an address A1. The sending device also sets the Transfer Attribute signal 714 to "000" to indicate that the payload for the address A1 will be transmitted on the write channel 606b. The Payload Size 718 signal may be used to indicate the size of the payload, which in this case is 16-bytes.

During the same first clock cycle 701, the sending device uses the Write medium 720 to transmit the first 4-bytes of the first payload W1(1). The sending device also asserts the Wvalid signal 724 to indicate that valid information is being transmitted on the write channel 606b.

At the end of the first clock cycle 701, the sending device checks for an asserted Write Address Transfer Ack signal 710 to confirm the successful delivery of the address A1 over the address channel 606a to the receiving device. The sending device also checks for an asserted Write Transfer Ack signal 722 to confirm the successful delivery of the first 4-bytes of the first payload W1(1) over the write channel 606b to the receiving device.

On the second clock cycle 702, the sending device transmits the address A2 for the second write operation on the 32-bit Address medium 708 before the first write operation completes. The sending device asserts the Write AValid signal 712 to indicate that valid information is being transmitted on the write address channel 606a. The sending device also asserts the Address/Data signal 713 to indicate that the information is an address A2. The sending device sets the Transfer Attribute signal 714 to "010" to indicate that the payload for the address A2 will be transmitted on the read address channel 606d. The Payload Size 718 signal may be used to indicate the size of the payload, which in this case is 12-bytes.

During the same second clock cycle 702, the sending device uses the Write medium 720 to transmit the second 4-bytes of the first payload W1(2), and asserts the Wvalid signal 724 to indicate that valid information is being transmitted on the write channel 606b. The sending device uses the Read Address medium 730 to send the first 4-bytes of the second payload W2(1), and asserts the Read AValid signal 728 to indicate that valid information is being transmitted on the read address channel 606d. The sending device deasserts the Read Address/Data signal 729 to indicate that the information being transmitted on the read address channel 606d is payload data.

At the end of the second clock cycle 702, the sending device checks for an asserted Write Address Transfer Ack signal 710 to confirm the successful delivery of the address A2 over the address channel 606a to the receiving device. The sending device also checks for asserted Write Transfer Ack and Read Address Transfer Ack signals 722, 726 to confirm the successful delivery of the payload data over the write and read address channels 606b, 606d.

On the third clock cycle 703, the sending device asserts the Write AValid signal 712 to indicate that valid information is being transmitted on the write address channel 606a. The sending device also asserts the Address/Data signal 713 to indicate that the information is an address A3. The sending device sets the Transfer Attribute signal 714 to "001" to indicate that the payload for the address A3 will be transmitted on the write address channel 606a. The Payload Size 718 signal may be used to indicate the size of the payload, which in this case is 4-bytes.

During the same third clock cycle 703, the sending device uses the Write medium 720 to transmit the third 4-bytes of the first payload W1(3), and asserts the WValid signal 724 to indicate that valid information is being transmitted on the write channel 606b. The sending device uses the Read Address medium 730 to send the second 4-bytes of the second payload W2(2), and asserts the Read AValid signal 728 to indicate that valid information is being transmitted on the read address channel 606d. The sending device deasserts the Read Address/Data signal 729 to indicate that the information being transmitted on the read address channel 606d is payload data.

At the end of the third clock cycle 703, the sending device checks for an asserted Write Address Transfer Ack signal 710 to confirm the successful delivery of the address A3 over the address channel 606a to the receiving device. The sending device also checks for asserted Write Transfer Ack and Read Address Transfer Ack signals 722, 726 to confirm the successful delivery of the payload data over the write and read address channels 606b, 606d.

On the fourth clock cycle 704, the sending device uses the Write medium 720 to send the final 4-bytes of the first payload W1(4), and the Read Address medium 730 to send the final 4-bytes of the second payload W2(3). The sending device asserts the Wvalid and Read AValid signals 724, 728 to indicate that valid information is being transmitted on the write and read address channels 606b, 606d. The sending device deasserts the Read Address/Data signal 729 to indicate that the information being transmitted on the read address channel 606d is payload data.

The sending device uses Write address medium 708 to send the third payload W3, and asserts the Write AValid signal 712 to indicate that valid information is being sent on the write address channel 606a. The sending device deasserts the Address/Data signal 713 to indicate that the information transmitted on the write address channel 606a is payload data. The state of the Transfer Attribute signal 714 and Payload Size 718 signal may ignored.

Figure 8:
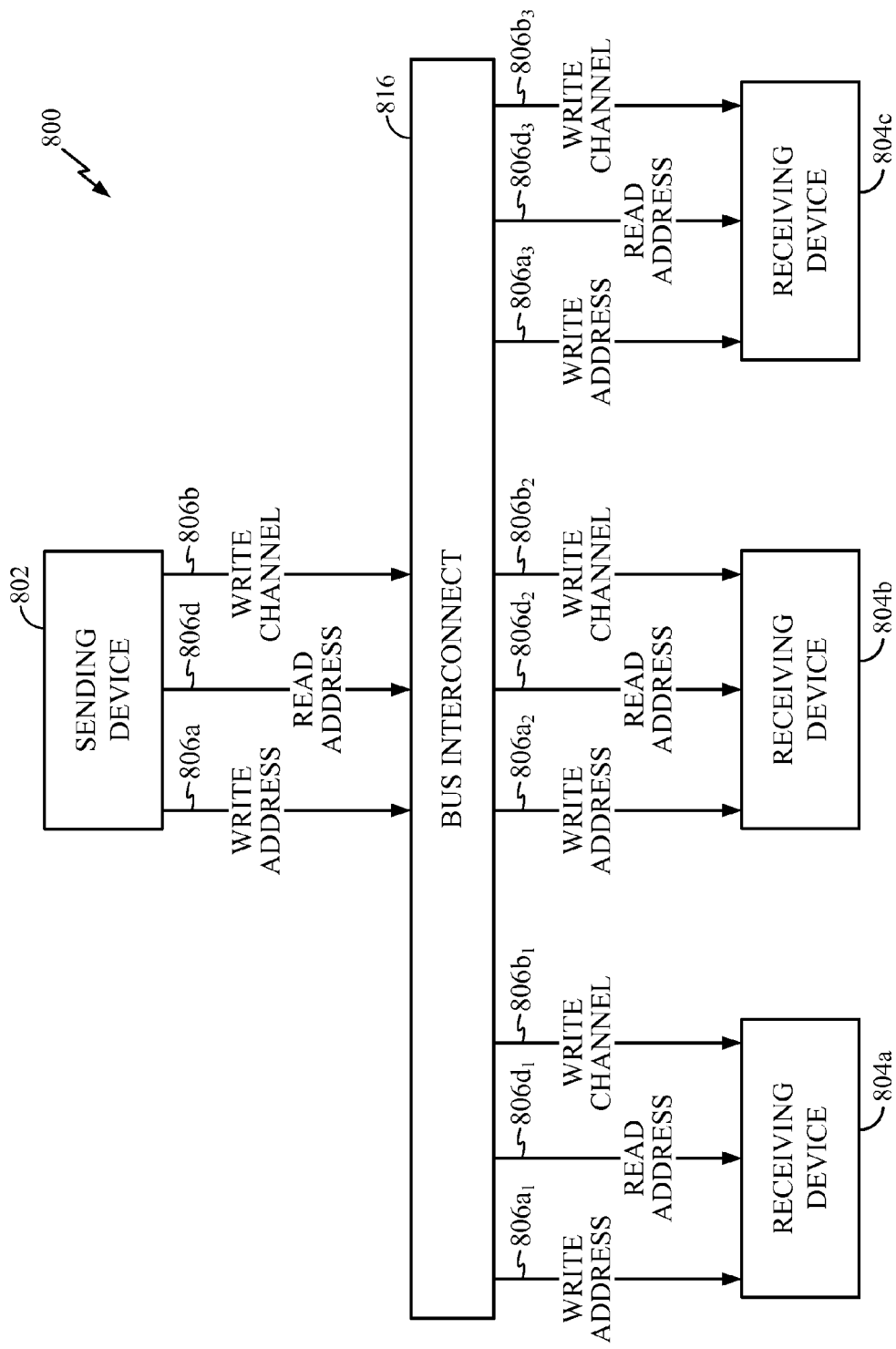
FIG. 8 is a simplified block diagram illustrating a sending device in communication with three receiving devices in a processing system.

FIG. 8 is a simplified block diagram illustrating a sending device 802 in communication with three receiving devices 804a-804c through a bus interconnect 816 in a processing system 800. In this example, the sending device 802 can write to all three receiving devices 804a-804c concurrently using the read and write address channels 806d, 806a as media for transmitting addresses and payloads. The bus interconnect 816 can then use the write address channels $806a_1$, $806a_2$, $806a_3$ to address the receiving devices 804a, 804b, 804c and the write channels $806b_1$, $806b_2$, $806b_3$ to transmit the payloads. In the case where the bus interconnect 816 needs to perform multiple write operations to one or more receiving devices 804a, 804b, 804c, the read and write address channels $806d_1$, $806d_2$, $806d_3$, $806a_1$, $806a_2$, $806a_3$ may also be used as generic media to transmit both addresses and payloads.

Figure 9:
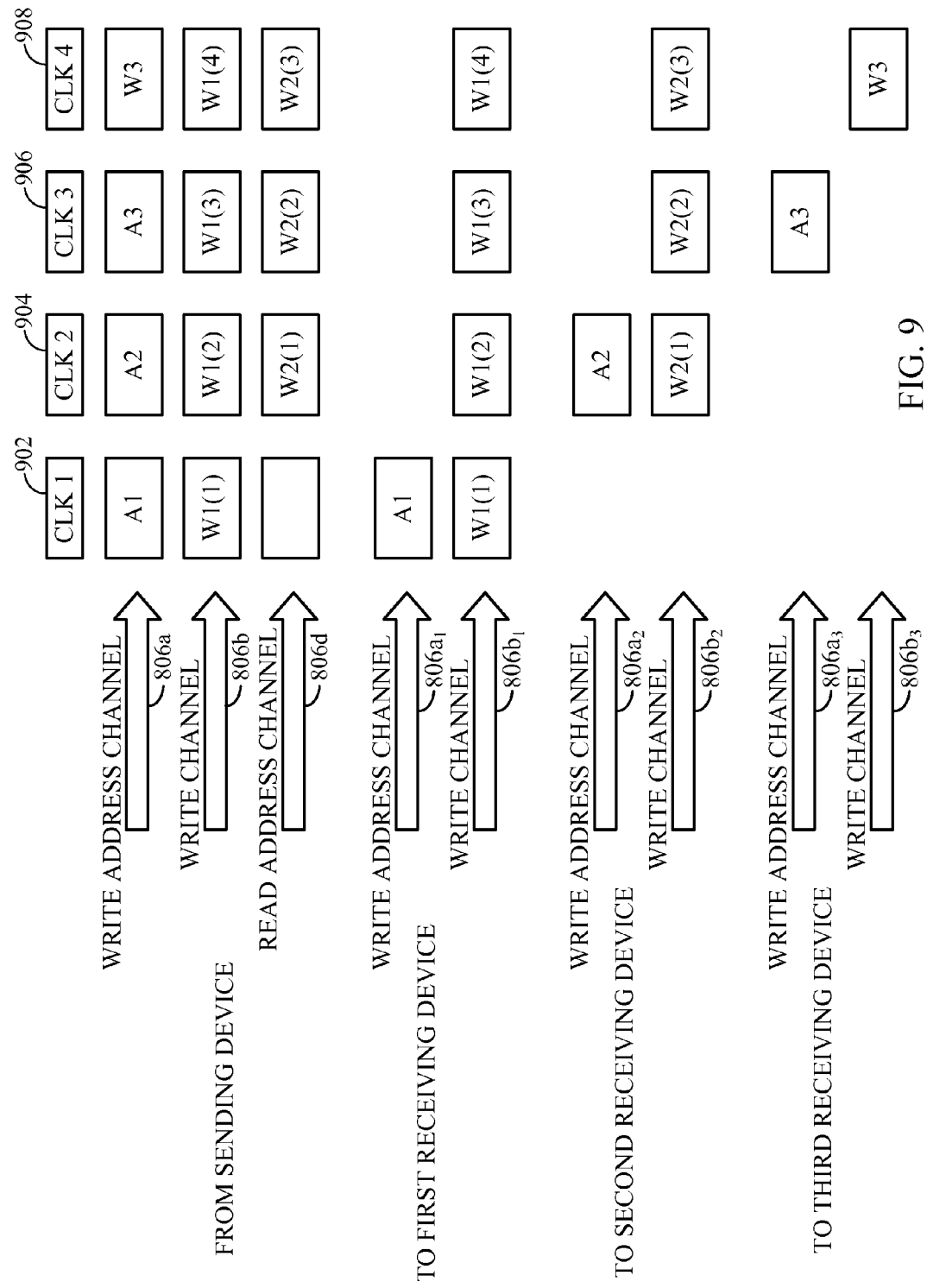
FIG. 9 is an illustration showing information flowing on the read and write address channels and write channels of a bus in the processing system of FIG. 8.

An example of will now be described with reference to FIG. 9. FIG. 9 is an illustration showing the information flowing on the address and write channels. In this example, the bus interconnect 816 will provide point-to-point connections that allow each transmission from the sending device 802 to reach one of the receiving devices 804a, 804b, 804c in the same clock cycle. In practice, however, the bus interconnect 816 may be a clocked device with buffering (see FIG. 8).

Referring to FIG. 9, on the first clock cycle 902, the sending device initiates the 16-byte write operation by sending an address A1 to the bus interconnect on the address channel 806a with the appropriate control signals. During the same clock cycle 902, the sending device also sends the first 4-bytes of the first payload W1(1) to the bus interconnect on the write channel 806b. The bus interconnect transmits the address A1 to the first receiving device 804a on the first receiving device's address channel $806a_1$, and transmits the first 4-bytes of the first payload W1(1) to the first receiving device 804a on the first receiving device's write channel $806b_1$.

On the second clock cycle 904, the sending device initiates the next write operation by sending an address A2 to the bus interconnect on the address channel 806a with the appropriate control signals. During the same clock cycle 904, the sending device also sends the second 4-bytes of the first payload W1(2) to the bus interconnect on the write channel 806b and the first 4-bytes of the second payload W2(1) to the bus interconnect on the read address channel 806d. The bus interconnect 816 transmits the address A2 to the second receiving device 804b on the second receiving device's address channel $806a_2$, transmits the second 4-bytes of the first payload W1(2) to the first receiving device 804a on the first receiving device's write channel $806b_1$, and transmits the first 4-bytes of the second payload W2(1) to the second receiving device 804b on the second receiving device's write channel $806b_2$.

On the third clock cycle 906, the sending device initiates the next write operation by sending an address A3 to the bus interconnect on the address channel 806a with the appropriate control signals. At the same time, the sending device also sends the third 4-bytes of the first payload W1(3) to the bus interconnect on the write channel 806b, and the second 4-bytes of the second payload W2(2) to the bus interconnect on the read address channel 806d. The bus interconnect 816 transmits the address A3 to the third receiving device 804c on the third receiving device's address channel $806a_3$, transmits the third 4-bytes of the first payload W1(3) to the first receiving device 804a on the first receiving device's write channel $806b_1$, and transmits the second 4-bytes of the second payload W2(2) to the second receiving device 804b on the second receiving device's write channel $806b_2$.

On the fourth clock cycle 908, the sending device sends the final 4-bytes of the first payload W1(4) to the bus interconnect on the write channel 806b, the final 4-bytes of the second payload W2(3) to the bus interconnect on the read address channel 806d, and the third payload W3 to the bus interconnect on the write address channel 806a. The bus interconnect 816 transmits the final 4-bytes of the first payload W1(4) to the first receiving device 804a on the first receiving device's write channel 806$b_1$, transmits the final 4-bytes of the second payload W2(3) to the second receiving device 804$b$ on the second receiving device's write channel 806$b_2$, and transmits the third payload W3 to the third receiving device 804$c$ on the third receiving device's write channel 806$b_3$.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the sending and/or receiving component, or elsewhere. In the alternative, the processor and the storage medium may reside as discrete components in the sending and/or receiving component, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A processing system, comprising:
a receiving device;
a bus having first, second and third channels; and
a sending device configured to:
address the receiving device on the first channel,
read from the receiving device on the second channel,
write to the receiving device on the third channel, and
select between:
a first bus transmission mode wherein payload write data is to be written to the receiving device on the third channel; and
a second bus transmission mode wherein first payload write data is to be written to the receiving device on the third channel during a first clock cycle and second payload write data is to be concurrently written to the receiving device on the first channel during the first clock cycle, wherein the first payload write data is associated with a first write operation and the second payload write data is associated with a second write operation, and wherein the first and second payload write data are distinct from address and control information.

2. The processing system of claim 1 wherein, in the second bus transmission mode, the sending device is further configured to write the second payload write data to a first address of the receiving device on the first channel and write the first payload write data to a second address of the receiving device on the third channel.

3. The processing system of claim 1 further comprising a second receiving device, and wherein, in the second bus transmission mode, the sending device is further configured to write the second payload write data to the receiving device on the first channel and write the first payload write data to the second receiving device on the third channel.

4. The processing system of claim 1 wherein the bus further comprises a fourth channel, the sending device being further configured to address the receiving device on the first channel for write operations and address the receiving device on the fourth channel for read operations, and wherein, in the first bus transmission mode, the sending device is further configured to select between the first, third and fourth channels to write the first payload write data to the receiving device.

5. The processing system of claim 4 wherein the sending device is further configured, in the second bus transmission mode, to write the first payload write data to a first address of the receiving device on one of the first, third and fourth channels and write the second payload write data to a second address of the receiving device on another one of the first, third and fourth channels.

6. The processing system of claim 4 wherein the sending device is further configured, in the second bus transmission mode, to write the second payload write data to a first address of the receiving device on the first channel, write the first payload write data to a second address of the receiving device on the third channel, and write a third payload write data to a third address of the receiving device on the fourth channel.

7. The processing system of claim 4 further comprising a second receiving device, and wherein the sending device is further configured, in the second bus transmission mode, to write the first payload write data to the receiving device on one of the first, third and fourth channels and write the second payload write data to the second receiving device on another one of the first, third and fourth channels.

8. The processing system of claim 4 further comprising second and third receiving devices, and wherein the sending device is further configured, in the second bus transmission mode, to write the second payload write data to the receiving device on the first channel, write the first payload write data to the second receiving device on the third channel, and write a third payload write data to the third receiving device on the fourth channel.

9. The processing system of claim 1 wherein the sending device is further configured to provide a control signal to the receiving device indicating whether the first channel is currently being used to address the receiving device or write the second payload write data to the receiving device.

10. The processing system of claim 1 wherein the sending device is further configured to provide a control signal to the receiving device while addressing the receiving device, the control signal indicating whether a payload for the address will be written to the receiving device on the first or third channel.

11. The processing system of claim 1, wherein the sending device writes the first payload write data in accordance with the selected bus transmission mode.

12. The processing system of claim 1, wherein writing of the first payload write data and writing of the second payload write data are completed during the first clock cycle.

13. A processing system, comprising:
a receiving device;
a bus having first, second and third channels;
means for addressing the receiving device on the first channel;
means for reading from the receiving device on the second channel;
means for writing to the receiving device on the third channel; and
means for selecting between:
a first bus transmission mode wherein payload write data is to be written to the receiving device on the first channel or the third channel; and
a second bus transmission mode wherein second payload write data is to be written to the receiving device on the first channel during a first clock cycle and first payload write data is to be concurrently written to the receiving device on the third channel during the first clock cycle, wherein the first payload write data is associated with a first write operation and the second payload write data is associated with a second write operation, and wherein the first and second payload write data are distinct from address and control information.

14. A method of communicating between a sending device and one or more receiving devices over a bus, the bus comprising first, second and third channels, the method comprising:
addressing a receiving device on the first channel;
reading from the receiving device on the second channel;
writing to the receiving device on the third channel; and
selecting between:
a first bus transmission mode wherein payload write data is to be written to the receiving device on the first channel or the third channel; and
a second bus transmission mode wherein second payload write data is to be written to the receiving device on the first channel during a first clock cycle and first payload write data is to be concurrently written to the receiving device on the third channel during the first clock cycle, wherein the first payload write data is associated with a first write operation and the second payload write data is associated with a second write operation, and wherein the first and second payload write data are distinct from address and control information.

15. The method of claim 14 further comprising, in the second bus transmission mode, writing the second payload write data to a first address of the receiving device on the first channel and writing the first payload write data to a second address of the receiving device on the third channel.

16. The method of claim 14 further comprising, in the second bus transmission mode, writing the second payload write data to the receiving device on the first channel and writing the first payload write data to a second receiving device on the third channel.

17. The method of claim 14 wherein the bus further comprises a fourth channel, and wherein the receiving device is addressed on the first channel for a write operation, the method further comprising addressing the receiving device on the fourth channel for a read operation, wherein, in the first bus transmission mode, the method further comprises selecting between the first, third and fourth channels to write the first payload write data to the receiving device.

18. The method of claim 17 further comprising, in the second bus transmission mode writing the first payload write data to a first address of the receiving device on one of the first, third and fourth channels and writing the second payload write data to a second address of the receiving device on another one of the first, third and fourth channels.

19. The method of claim 17 further comprising, in the second bus transmission mode, writing the second payload write data to a first address of the receiving device on the first channel, writing the first payload write data to a second address of the receiving device on the third channel and writing a third payload write data to a third address of the receiving device on the fourth channel.

20. The method of claim 17 further comprising, in the second bus transmission mode, writing the first payload write data to the receiving device on one of the first, third and fourth channels and writing the second payload write data to a second receiving device on another one of the first, third and fourth channels.

21. The method of claim 17 further comprising, in the second bus transmission mode, writing the second payload write data to the receiving device on the first channel, writing the first payload write data to a second receiving device on the third channel, and writing a third payload write data to a third receiving device on the fourth channel.

22. The method of claim 14 further comprising providing a control signal to the receiving device indicating whether the first channel is currently being used to address the receiving device or write the second payload write data to the receiving device.

23. The method of claim 14 further comprising providing a control signal to the receiving device while addressing the receiving device, the control signal indicating whether a payload for the address will be written to the receiving device on the first or third channel.

24. A bus mastering device, comprising:
a processor; and
a bus interface configured to:
interface the processor to a bus having first, second and third channels,
address a slave on the first channel,
receive from the slave on the second channel,
write to the slave on the third channel, and
select between
a first bus transmission mode wherein payload write data is to be sent to the slave on the first channel or the third channel; and
a second bus transmission mode wherein second payload write data is to be sent to the slave on the first channel during a first clock cycle and first payload write data is to be concurrently sent to the slave on the third channel during the first clock cycle, wherein the first payload write data is associated with a first write operation and the second payload write data is associated with a second write operation, and wherein the first and second payload write data are distinct from address and control information.

25. The bus mastering device of claim 24 wherein the bus interface device is further configured, in the second bus transmission mode, to send the second payload write data to a first address of the slave on the first channel and send the first payload write data to a second address of the slave on the third channel.

26. The bus mastering device of claim 24 wherein the bus interface is further configured, in the second bus transmission mode, to send the second payload write data to the slave on the first channel and send the first payload write data to a second slave on the third channel.

27. The bus mastering device of claim 24 wherein the bus further comprises a fourth channel, and wherein the bus interface is further configured to address the slave on the first channel for write operations and address the slave on the fourth channel for read operations, and wherein, in the first bus transmission mode, the bus interface is further configured to select between the first, third and fourth channels to send the first payload write data to the slave.

28. The bus mastering device of claim 27 wherein the bus interface is further configured, in the second bus transmission mode, to send the first payload write data to a first address of the slave on one of the first, third and fourth channels and send the second payload write data to a second address of the slave on another one of the first, third and fourth channels.

29. The bus mastering device of claim 27 wherein the bus interface is further configured, in the second bus transmission mode, to send the second payload write data to a first address of the slave on the first channel, send the first payload write data to a second address of the slave on the third channel, and send a third payload write data to a third address of the slave on the fourth channel.

30. The bus mastering device of claim 27 wherein the bus interface is further configured, in the second bus transmission mode, to send the first payload write data to the slave on one of the first, third and fourth channels and send the second payload write data to a second slave on another one of the first, third and fourth channels.

31. The bus mastering device of claim 27 further comprising second and third slaves, and wherein the bus interface is further configured, in the second bus transmission mode, to send the second payload write data to the slave on the first channel, send the first payload write data to a second slave on the third channel, and send a third payload write data to a third slave on the fourth channel.

32. The bus mastering device of claim 24 wherein the bus interface is further configured to provide a control signal to the slave indicating whether the first channel is currently being used to address the slave or send the second payload write data to the slave.

33. The bus mastering device of claim 24 wherein the bus interface is further configured to provide a control signal to the slave while addressing the slave, the control signal indicating whether a payload for the address will be sent to the slave on the first or third channel.

34. The slave device of claim 24 wherein the bus interface is further configured to receive a control signal from the bus mastering device while the memory is being addressed, the control signal indicating whether a payload for the address will be received on the first or third channel.

35. A bus mastering device, comprising:
a processor; and
means for interfacing the processor to a bus having first, second and third channels, the means for interfacing the processor to the bus comprising:
  means for addressing a slave on the first channel,
  means for receiving from the slave on the second channel,
  means for writing to the slave on the third channel, and
  means for selecting between:
    a first bus transmission mode wherein payload write data is to be sent to the slave on the first channel or the third channel; and
    a second bus transmission mode wherein second payload write data is to be sent to the slave on the first channel during a first clock cycle and first payload write data is to be concurrently sent to the slave on the third channel during the first clock cycle, wherein the first payload write data is associated with a first write operation and the second payload write data is associated with a second write operation, and wherein the first and second payload write data are distinct from address and control information.

36. A slave device, comprising:
memory; and
a bus interface configured to:
  interface the memory to a bus having first, second and third channels,
  receive a memory address on the first channel,
  in a first bus transmission mode, receive payload data from a bus mastering device on the first channel or the second channel,
  in a second bus transmission mode, receive second payload write data from the bus mastering device on the first channel during a first clock cycle and concurrently receive first payload write data from the bus mastering device on the second channel during the first clock cycle, wherein the first payload write data is associated with a first write operation and the second payload write data is associated with a second write operation, and wherein the first and second payload write data are distinct from address and control information, and
  send a payload to the bus mastering device on the third channel.

37. The slave device of claim 36 wherein the bus further comprises a fourth channel, wherein the memory is further configured to be addressed through the bus interface by the bus mastering device on the first channel for write operations and on the fourth channel for read operation, the bus interface being further configured to receive, in the second bus transmission mode, a third payload write data from the bus mastering device on the fourth channel.

38. The slave device of claim 36 wherein the bus interface is further configured to receive a control signal from the bus mastering device indicating whether the first channel is currently being used to address the memory or receive the second payload write data.

39. A slave device, comprising:
memory; and
means for interfacing the memory to a bus having first, second and third channels, the means for interfacing the memory to the bus comprising:
  means for receiving a memory address on the first channel,
    means for receiving, in a first bus transmission mode, payload data from a bus mastering device on the first channel or the second channel,
    means for receiving, in a second bus transmission mode, second payload write data from the bus mastering device on the first channel during a first clock cycle and concurrently receiving first payload write data from the bus mastering device on the second channel during the first clock cycle, wherein the first payload write data is associated with a first write operation and the second payload write data is associated with a second write operation, and wherein the first and second payload write data are distinct from address and control information, and
  means for sending a payload to the bus mastering device on the third channel.

* * * * *